Oct. 4, 1960   W. M. BECKER   2,954,875
COMBINATION DISH RACK AND DRAINBOARD
Filed April 10, 1958

INVENTOR.
WAYNE M. BECKER

BY HIS ATTORNEYS
HARRIS, KIECH, FOSTER & HARRIS

United States Patent Office 2,954,875
Patented Oct. 4, 1960

2,954,875

COMBINATION DISH RACK AND DRAINBOARD

Wayne M. Becker, Studio City, Calif., assignor to Burroughs Manufacturing Corp., Los Angeles, Calif., a corporation of California Filed Apr. 10, 1958, Ser. No. 727,611

4 Claims. (Cl. 211—41)

This invention relates to a dish drainer, and particularly an integral dish rack and drainboard combination of the type that can be placed adjacent a sink or pan to catch water dripping or draining from freshly washed dishes placed in the dish rack to dry.

Dish drainers of this type should be of efficient and durable construction. They should be sanitary and should not corrode and thus cause rust stains on the supporting sink or table top. Also, they should not be constructed of hard or sharp materials which may scratch or chip sink tops made of such materials as stainless steel, tile, porcelain, etc. In addition, they should be made up of a minimum number of parts tightly assembled so that they will not come loose and drop on the sink top and damage the same.

Accordingly, it is an important object of my invention to provide a dish drainer of efficient and durable construction.

Another object is to provide a combination dish rack and drainboard of unitary construction.

A further object is to provide such a dish rack and drainboard construction made of flexible plastic material such as polyethylene plastic.

Additional objects and advantages of my invention will become apparent from the following description.

Stated in general terms, the objects of my invention are accomplished by providing a dish drainer including a drain member having a continuous bottom portion for collecting and draining water dripping from dishes supported in a rack member formed integrally with the drain member. The combination is made as a unit without assembled parts and preferably is molded as a single piece so that no parts can come loose and drop on the sink top. Plastics are preferred as materials of construction for my dish rack and drainboard combination, and, because of its low price, polyethylene is especially preferred.

Polyethylene and similar plastics are flexible and present a problem in producing a dish rack of sufficient rigidity to hold dishes mounted therein. Also, the drainboard member should be sufficiently rigid to permit convenient handling and placing of the article without folding or collapsing thereof. These problems have been overcome in my molded unitary article by forming reinforcing members in the dish rack and rigidifying ribs and channels in the drainboard member.

A more detailed description of a specific embodiment of my invention is given below primarily for illustrative purposes in connection with the appended drawing wherein.

Figure 1:
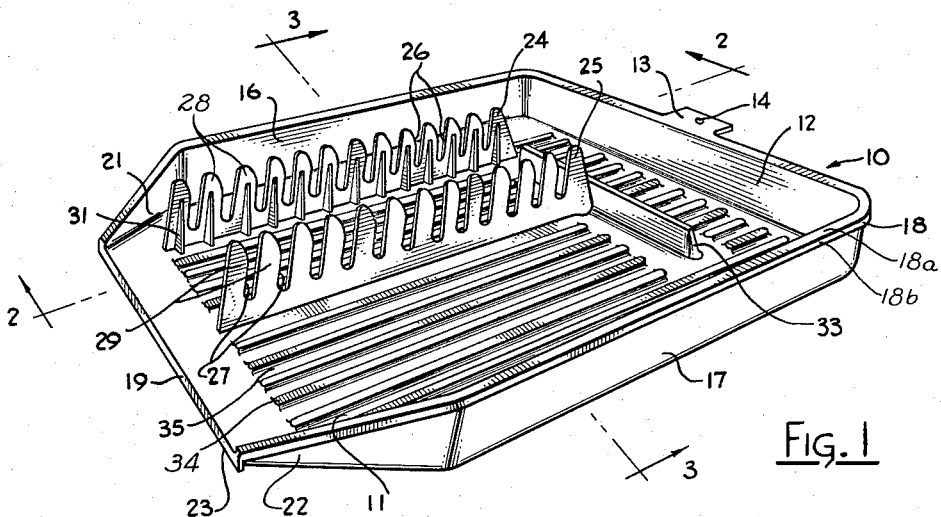
Fig. 1 is a perspective view showing a preferred embodiment of my dish rack and drainboard combination made of a flexible plastic such as polyethylene and provided with reinforcing and rigidifying structures.
Figure 2:
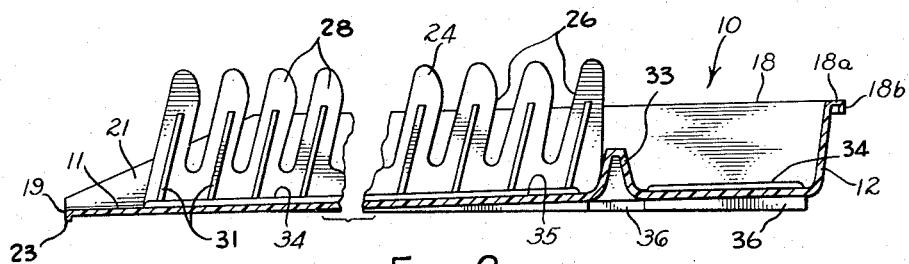
Fig. 2 is a longitudinal sectional view taken on the line 2—2 of Fig. 1 showing one side of the dish rack member.
Figure 3:
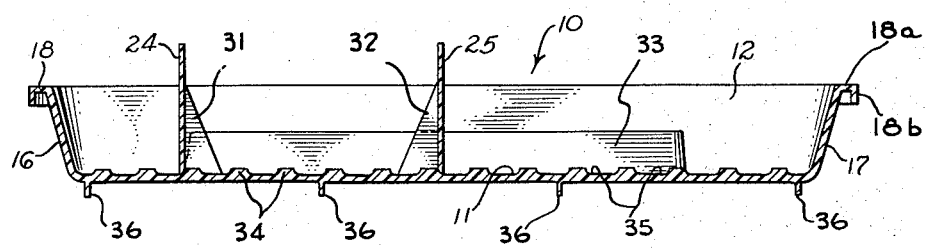
Fig. 3 is a cross-sectional view taken on the line 3—3 of Fig. 1 showing reinforcing members buttressing the dish rack members and rigidifying ribs and channels on the bottom portion of the drain member.

The drain member 10 is formed with a generally rectangular bottom portion 11 having a continuous surface for water to flow thereover. The bottom portion 11, in turn, is provided with an integral end wall 12 having an integral lug 13 formed therein with an eye 14 therethrough for conveniently hanging the dish rack and drainboard combination out of the way on a nail or hook when not in use. Opposed side walls 16 and 17 are formed integrally with the bottom portion 11. The end wall 12 and side walls 16 and 17 are relatively shallow and are upstanding but preferably are inclined outwardly somewhat from the vertical. An integral bead 18 is formed around the upper edges of the end and side walls 12, 16 and 17 to rigidify these walls. The bead 18, as best shown in Figs. 2 and 3, is provided with an outwardly extending horizontal portion 18a and a downwardly extending vertical portion 18b.

The side walls 16 and 17 do not extend all the way to the end 19 of the bottom portion 11 opposite end wall 12 but merge, respectively, into converging walls 21 and 22, which converge both toward each other and toward the plane of the bottom portion 11. The converging walls 21 and 22 are of generally triangular shape and also are inclined outwardly somewhat from the vertical as are walls 12, 16 and 17. The converging walls 21 and 22 do not meet each other and result in making end 19 shorter than the opposite end of bottom portion 11. The bead 18 is continued along the upper edges of converging walls 21 and 22 and merges at end 19 into the opposite ends of a shallow, downwardly extending lip 23 extending along the end 19 of bottom portion 11. The lip 23 imparts rigidity to the end 19 and extends downwardly toward the surface on which bottom portion 11 is supported to assist in neatly draining water from the bottom portion 11 onto a sink drainboard, for example.

A dish rack consisting of two rack members 24 and 25 is attached to the bottom portion 11. The rack members 24 and 25 preferably are integrally attached to the bottom portion, such as by being molded therewith as a single unit, and preferably extend upwardly at right angles to the plane of the bottom portion. The rack members 24 and 25 preferably are in spaced parallel relationship with respect to each other and preferably are positioned nearer to one of the side walls 16 and 17 than the other. In the drawing, rack member 24 is shown positioned adjacent side wall 16 and rack member 25 is shown positioned about midway between the side walls 16 and 17. Both rack members extend from points spaced inwardly of end 19 to points spaced inwardly of end wall 12. This positioning of the rack members 24 and 25 provides space for cups, bowls, etc., between rack member 25 and side wall 17 and for silverware between end wall 12 and the adjacent ends of the rack members, in addition to plates in the dish rack.

The rack members 24 and 25 are provided with spaced slits 26 and 27, respectively, to form alternating slits and upstanding projections 28 and 29, respectively. The slits 26 and 27 are made wide enough to receive plates and preferably are slightly inclined backwardly from the end 19 of the drain member 10 so that plates positioned in the slits with their insides facing end 19 will be held in approximately vertical positions for rapid draining and drying. The projections 28 and 29 are made of appropriate widths to space the plates positioned in slits 26 and 27 from each other. Projections 28 and 29 are rigidified by reinforcing or buttressing members 31 and 32, which are molded integrally with the insides of projections 28 and 29, respectively, and the bottom portion 11.

The bottom portion 11 also is rigidified by having formed transversely therein an upwardly projecting ridge 33, as shown in the drawing. The ridge 33 preferably is hollowed out from the under side of bottom portion 11 as best shown in Fig. 2 to save weight and material, and preferably is spaced inwardly from end wall 12 to about the end of rack member 25. The ridge 33 is functionally located so as to serve as a partitioning element dividing the bottom portion 11 into an upper area bounded by end wall 12 and a larger lower area extending to end 19. The bottom portion 11 is additionally rigidified and reinforced by alternating parallel spaced ribs 34 and channels 35 running from about the ends of rack members 24 and 25 adjacent end 19 to the base of end wall 12, except where interrupted by ridge 33. The bottom portion 11 is further rigidified and reinforced by integral runners 36 formed on the under side of the bottom portion in parallel spaced relationship. The runners extend from about the base of end wall 12 toward the end 19 except where interrupted by the ridge 33. The runners 36 converge from the end wall 12 and merge into the under side of bottom portion 11 to tilt the same so that water dripping and draining from dishes and silverware in the dish rack and bottom portion flows through channels 35 toward end 19 and downwardly over lip 23.

It will be seen that I have provided a dish drainer of efficient and durable construction which can be molded as a unit from flexible plastic material such as low cost polyethylene resins. The dish rack and drainboard combination described above is sanitary in that it offers no cracks or crevices for the collection of dirt or bacteria and cannot corrode to form rust stains on sink tops. It also will not scratch or chip sink drainboards or tops and is conveniently handled for cleaning, use and storage.

Although a specific embodiment of my invention has been described above, it will be understood that such changes and modifications in the design, structure and details of the illustrated dish rack and drainboard may be made as come within the scope of the appended claims without departing from the spirit of the invention.

I claim as my invention:

1. A combination dish rack and drainboard molded of flexible plastic material as an integral unit comprising: a substantially impervious four-sided bottom portion having a pair of upstanding side walls and a single end wall integral therewith and with each other to close three of said sides, the fourth side providing a water outlet opening; an upstanding transverse ridge integral with said bottom portion transverse to said side walls but terminating short thereof to define at least one drainage passage, said upstanding ridge dividing said bottom portion into a smaller upper area transverse to said side walls between said ridge and said end wall and a larger lower area between said ridge and said water outlet opening; and dish supporting means occupying only a portion of said larger area and comprising a pair of upstanding rack members spaced from each other exclusively in that portion of said larger area opposite said ridge and extending parallel to said side walls, said ridge substantially blocking the space between said rack members from drainage of water from said smaller area and for guiding such water from said smaller area through said drainage passage to a portion of said larger area not occupied by said dish supporting means, said rack members having transversely aligned dish receiving slots separated by upstanding projections.

2. A combination dish rack and drainboard as defined in claim 1 in which said ridge is formed of parallel walls joined at their upper edges and spaced to form a hollow interior opening downwardly on the bottom side of said bottom portion, the ends of said parallel walls terminating short of said side walls to form two of said drainage passages at opposite ends of said upstanding ridge.

3. A combination dish rack and drainboard as defined in claim 1 in which said bottom portion includes a plurality of upstanding longitudinal ridges parallel to said side walls in both said smaller upper area and in said larger lower area with shallow grooves therebetween, said longitudinal ridges being interrupted by said transverse ridge, the longitudinal ridges of said smaller area terminating short of said transverse ridge to form a transverse drainage channel for guiding said drainage water from said smaller area to said drainage passage.

4. A combination dish rack and drainboard as defined in claim 1 in which said transverse partitioning ridge extends upwardly a distance substantially less than the height of said rack members.

References Cited in the file of this patent

UNITED STATES PATENTS

| | | |
|---|---|---|
| 629,784 | Flindall | Aug. 1, 1899 |
| 896,432 | Booth | Aug. 18, 1908 |
| 933,180 | Johnson | Sept. 7, 1909 |
| 1,025,178 | Wingender | May 7, 1912 |
| 1,224,838 | Blissman | May 1, 1917 |
| 2,378,628 | Gray | June 19, 1945 |
| 2,885,087 | Bliss | May 5, 1959 |

FOREIGN PATENTS

| | | |
|---|---|---|
| 1,155,951 | France | Dec. 9, 1957 |